United States Patent [19]

Mills

[11] Patent Number: 5,558,352
[45] Date of Patent: Sep. 24, 1996

[54] TRAILER HITCH ALIGNMENT DEVICE

[76] Inventor: Malcolm L. Mills, 1890 Camino de la Cienega, Tucson, Ariz. 85715

[21] Appl. No.: 396,565

[22] Filed: Mar. 1, 1995

[51] Int. Cl.$^6$ .................................................. B60D 1/40
[52] U.S. Cl. ................................................ 280/477; 33/264
[58] Field of Search ......................... 280/477, 432; 33/264, 286, 288

[56] References Cited

U.S. PATENT DOCUMENTS

| | | | |
|---|---|---|---|
| 3,774,149 | 11/1973 | Bennett | 280/477 X |
| 3,901,536 | 8/1975 | Black | 280/477 |
| 3,966,231 | 6/1976 | Metzler | 280/477 |
| 4,012,056 | 3/1977 | Christensen | 280/477 |
| 4,054,302 | 10/1977 | Campbell | 280/477 |
| 4,169,610 | 10/1979 | Paufler | 280/477 |
| 4,187,494 | 2/1980 | Jessee | 280/477 X |
| 4,285,138 | 8/1981 | Berry | 280/477 X |
| 4,313,264 | 2/1982 | Miller, Sr. | 280/477 X |
| 4,666,176 | 5/1987 | Sand | 280/477 |
| 4,723,788 | 2/1988 | Suter | 280/477 |
| 5,035,441 | 7/1991 | Murray | 280/477 |
| 5,269,554 | 12/1993 | Law et al. | 280/477 |
| 5,335,930 | 8/1994 | Tighe | 280/477 |

Primary Examiner—Kevin T. Hurley
Attorney, Agent, or Firm—Ogram & Teplitz, P.C.

[57] ABSTRACT

A trailer hitch alignment device which allows the driver of a vehicle to align the hitch of the driven vehicle with that of its trailer with no aid from another individual. The invention utilizes two masts having acrylic flags attached thereto mounted upon the hitch components of the respective vehicles to provide visual reference points for the driver. The acrylic flags are bright in color which allow them to be sufficiently illuminated by the reverse lights of the towing vehicle during times of darkness, thereby making night-time hitch alignment possible. Each mast is mounted to a hitch component via a dome-shaped base having several magnets underneath. The magnets provide the attraction force necessary to mount the masts to the hitch components and the shape of the mounting bases provide the bases with the ability to mounted upon virtually any hitch configuration. The mountings are further secured through the use of velcro-type straps which extend from the mounting bases to the hitch components. This enhances stability and, therefore, performance of the invention when alignment is required over rough terrain or high winds. The invention further has a swing arm offset bracket to allow for the mounting of the masts on towing vehicles having spare tires mounted on their rear.

18 Claims, 3 Drawing Sheets

5,558,352

TRAILER HITCH ALIGNMENT DEVICE

BACKGROUND OF THE INVENTION

The present invention relates to automotive accessories and, more particularly, to accessories for facilitating the alignment of the hitches of a towing vehicle and a towed vehicle (hereinafter "trailer").

One of the most frustrating and difficult tasks for the driver of a motor vehicle to perform is to align/couple the trailer hitch of a towing vehicle with that of a trailer. The reason for the difficulty is the fact that the respective trailer hitches are out of the sight of the driver. Therefore, it was traditionally necessary to have a second person direct the driver into alignment with the towing vehicle. Otherwise, if the driver attempted such a task alone, the driver would have to repeatedly exit the vehicle and walk around to the rear of the vehicle to determine the relative locations of the hitches. Aside from the obvious difficulties and frustrations associated with aligning the hitches, there is also the risk of vehicle damage caused by the driver misjudging the distances required to couple, thus colliding the towing vehicle with the trailer.

A number of hitch alignment devices have been devised which attempt to solve the problems discussed herein. The devices range from those which have components mounted to both the towing vehicle and the towed vehicle to those which have components mounted exclusively to the towed vehicle. Examples of these devices include U.S. Pat. No. 5,035,441 issued to Murray, U.S. Pat. No. 4,723,788 issued to Suter, and U.S. Pat. No. 4,285,138 issued to Berry. While these devices offer vast improvements over the traditional method of aligning hitches, they have their own unique limitations.

Specifically, some, if not all of these devices are limited in application to the type of hitch/coupler designs and hitch ball sizes to which they can attach, they are limited to the position of the towing vehicle's hitch relative to the towing vehicle, they provide inadequate performance in rough uneven terrain or strong breezes, they are not practicable for use on vehicles which have a spare tire mounted on the rear of the towing vehicle, and they do not provide aid in alignment in times of darkness.

Considering these design limitations and the continuing need for aid in the alignment and coupling of towing hitches, it is clear that a simple and effective device is needed which overcomes these limitations without sacrificing performance. The following invention accomplishes these goals.

SUMMARY OF THE INVENTION

The invention is a device for aiding in the alignment and coupling of the towing hitches of a towing vehicle and its trailer. The invention provides a user with the means to individually align the respective hitches through a simple and comprehensive design which is compatible with a great variety of vehicles and hitch types.

The design essentially provides a driver of a towing vehicle with the visual reference points to individually align the towing hitches of a vehicle and its trailer. The invention accomplishes this task with the use of two masts, one for mounting to the hitch of the towing vehicle, and one for mounting to the hitch of the trailer.

Each mast is comprised of at least two sections which attach together to form a single mast. This provides for ease of storage of the device when desired.

Preferably, at the top of each mast is a rigid acrylic flag. Each flag is bright in color which enables it to be visible by the driver of the towing vehicle during night-time alignment. Specifically, each flag is sufficiently illuminated by the reverse lights of the towing vehicle.

One mast is mounted to the hitch of a trailer via a dome shaped base. At the bottom of the base are several magnets which act to adhere the base to the hitch. The base is further secured by the use of a velcro-type strap (hook and loop arrangement) which extends from the base around the hitch component of the trailer. Since the strap is a hook and loop arrangement, the strap is quickly and easily removable by the user of the device.

The second mast is mounted to the hitch of a towing vehicle via a mounting bracket. The mounting bracket is C-shaped and the mast is mounted on the upper part of the bracket. This enables the bracket to be mounted directly over the hitch of the towing vehicle and provides a contact area for the hitch of the trailer to alert the driver when coupling alignment has been achieved.

Like the mounting base of the trailer mast, the mounting bracket has a dome shaped portion with magnets attached on the bottom. This allows the mounting bracket to be attached to the hitch of the towing vehicle through the attraction of the magnets. The mounting bracket is further secured through the use of a second hook and loop strap which extends from the mounting bracket around the hitch of the towing vehicle.

Once the masts are connected to the respective hitches, the driver of the towing vehicle uses the rigid acrylic flags as references, and directs the towing vehicle in position for hitching. When the proper position is achieved, the masts and their related components are removed from the respective vehicles and stored away. The trailer is then hitched to the towing vehicle.

The invention, together with the various embodiments thereof, will be more fully explained by the accompanying drawings and the following descriptions.

DETAILED DESCRIPTION OF THE INVENTION

Figure 1:
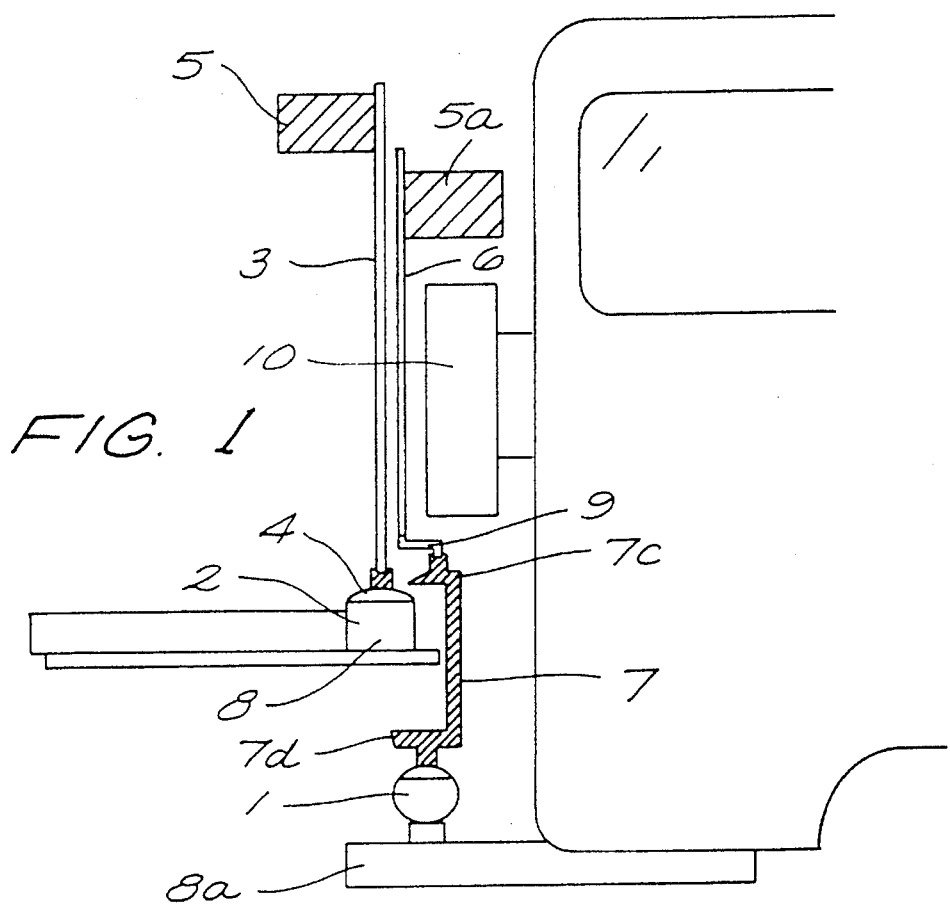
FIG. 1 is a side view of the preferred embodiment of the invention, showing the major components of the invention and their relation to each other.

FIG. 1 is a side view of the preferred embodiment of the invention, showing the major components of the invention and their relation to each other.

Shown is the hitch ball component of a towing vehicle 1 and the hitch coupler component of a trailer 2.

Attached to hitch component 2 is mast 3. In the preferred embodiment, mast 3 has a cylindrical cross-section, however, those of ordinary skill in the art readily recognize alternative cross-section configurations of mast 3.

Figure 2:
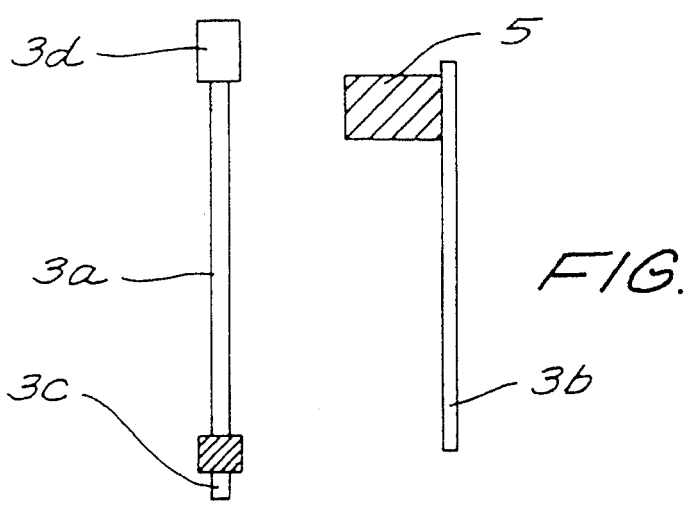
FIG. 2 is a detailed view of a disassembled mast section.

For easy removal and storage, mast 3 is comprised of a plurality of detachable sections. This is best depicted in FIG. 2 which shows mast 3 in its unassembled state. In the preferred embodiment, mast 3 is composed of two sections, section 3a and section 3b (shown in FIG. 2). Section 3a is the base part of mast 3. At the base portion of section 3a is threaded section 3c which, as will be explained, mounts mast 3 to its base section 4 (FIG. 1). Section 3a is attached to section 3b via mounting sleeve 3d. Mounting sleeve 3d fits snugly around section 3a. Section 3b is inserted into mounting sleeve 3d and, therefore, removably attached to section 3a, thereby forming mast 3. When the user (not shown) desires to disassemble mast 3, section 3b is merely pulled from section 3a and the sections are stored away as desired.

While the preferred embodiment shows mast 3 as being comprised of two sections, those of ordinary skill in the art readily recognize that mast 3 may be comprised of more than two sections or, alternatively, may be a single piece. Similarly, while the preferred embodiment shows mounting sleeve 3d as the means for connecting section 3a to section 3b, those of ordinary skill in the art readily recognize alternative attaching mechanisms to accomplish this task.

Figure 3A:
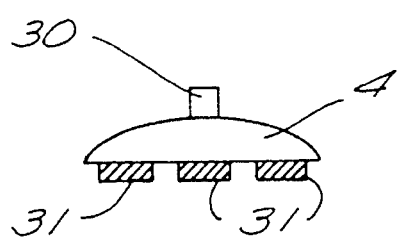
FIG. 3a is a side view of the mounting base for the mast to be attached to the hitch of a trailer.
Figure 3B:
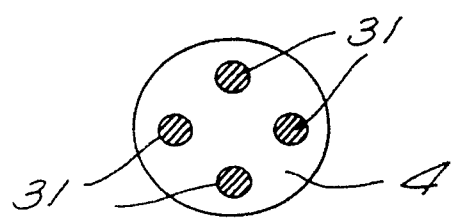
FIG. 3b is a bottom view of the mounting base for the mast to be attached to the hitch of a trailer.

Mast 3 is mounted to hitch 2 via base 4. As shown in FIG. 2, section 3a of mast 3 has a threaded portion 3c. FIG. 3a is a side view of base 4. Base 4 has a threaded section 30. Threaded section 30 corresponds to threaded section 3c of section 3a of mast 3 (FIG. 2). In order to mount mast 3 to base 4, section 3c of section 3a is screwed into threaded section 30 of base 4. When this is done, section 3a and, therefore, mast 3, is connected to base 4.

As best shown in FIG. 3a, base 4 is dome shaped. This provides for the stable mounting of base 4 to a variety of hitch configurations. On the underside of base 4, are magnets 31, which provide immediate connection between base 4 and hitch 1.

As shown in FIG. 1, base 4 is placed on hitch 2. Magnets 31 provide attraction force between base 4 and hitch 2, thereby attaching base 4 to hitch 2. In order to provide a stronger bond to hitch 2, base 4 has strap 8 attached thereto. Strap 8 extends from base 4 and extends around hitch 2. In the preferred embodiment, strap 8 is a hook and loop arrangement well known to those having ordinary skill in the art, thereby providing for easy removal by the user (not shown). Those of ordinary skill in the art readily recognize alternatives to making strap 8 quickly and easily removable.

Flag 5 is mounted at the upper end of mast 3. This provides a visual reference for the driver of the towing vehicle. In the preferred embodiment, flag 5 is rigid and acrylic, which gives the flag durability to account for the variety of weather conditions it may face. Further, flag 5 is bright in color. This, in combination with flag 5 being acrylic, provides flag 5 with the ability to be seen at night from the light of the towing vehicle's back-up lights.

Mast 6 is mounted upon the towing vehicle's hitch 1 via mounting base 7. Similar to mast 3, mast 6 is comprised of at least two sections using a sleeve similar to sleeve 3d to join the sections. Also similar to mast 3, the lower section of mast 6 has a threaded portion which provides an attachment means to mounting base 7.

Figure 4:
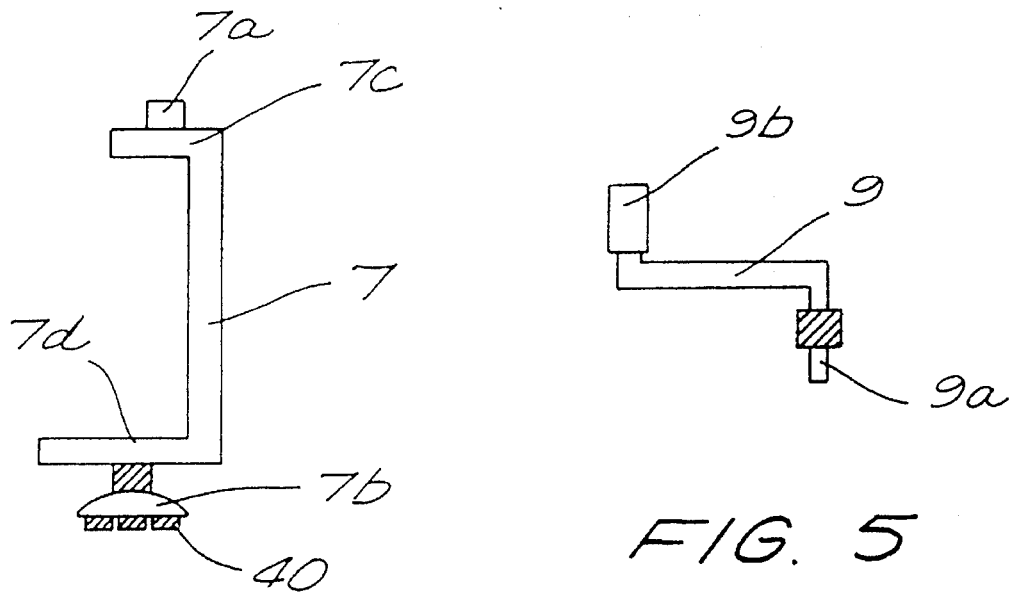
FIG. 4 is a side view of the mounting bracket for the mounting of the mast to be attached to the hitch ball of a towing vehicle.

FIG. 4 is a side detailed view of mounting base 7. As shown, mounting base 7 is substantially C-shaped. At the upper part of mounting base 7 is threaded section 7a into which the threaded portion of mast 6 is inserted. This provides a means for detachably connecting mast 6 to base 7. At the lower part of base 7 is the mounting section 7b. Similar to base 4, mounting section 7b is domed in shape. As with base 4, this shape provides a means for base 7 to be securely attached to the hitch 1 of a towing vehicle. On the underside of mounting section 7b are magnets 40 which provide for attraction between mounting section 7b and hitch 1.

Best shown in FIG. 1, base 7 is further secured to hitch 1 by strap 8a which extends from base 7 around hitch 1. As noted, in the preferred embodiment, strap 8a is hook and loop, however, alternatives exist which provide strap 8a with fast and simple removal by the user (not shown).

Figure 5:
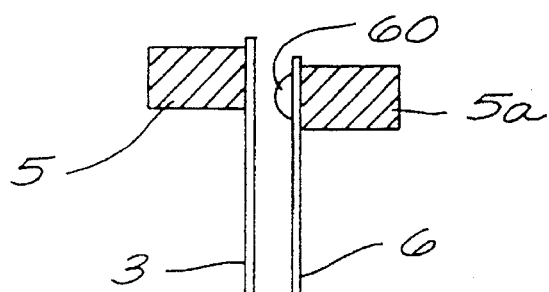
FIG. 5 is a side view of the swing arm for the mounting of the mast to a vehicle having a spare tire mounted in a fixed position to its rear.

FIG. 1 shows the preferred embodiment of the invention using swing arm 9 to provide a means for mounting mast 6 to a vehicle having a spare tire mounted on its rear. As best shown in FIG. 5, which is a detailed side view of swing arm 9, bracket 9 has a threaded portion 9a which attaches to corresponding threaded portion 7e in mounting bracket 7. Swing arm 9 is shaped such that it provides a mounting for mast 6 rearward. This enables mast 6 to extend from a point rearward of spare tire 10 of the towing vehicle. At the upper part of arm 9 is mounting sleeve 9b into which mast 6 is inserted.

Shown in FIGS. 1, flag 5a is mounted at the upper end of mast 3. This provides a visual reference for the driver of the towing vehicle. In the preferred embodiment, flag 5a is also rigid and acrylic, which gives the flag durability to account for the variety of weather conditions it may face. Further, flag 5a is bright in color. This, in combination with flag 5a being acrylic, provides flag 5a with the ability to be seen at night from the light of the towing vehicle's back-up lights.

In operation, once the preferred invention is attached to hitches 1 and 2, the driver of the towing vehicle uses flags 5 and 5a as visual references. Since, as shown in FIG. 1, masts 3 and 6 are attached directly over the hitch components of the respective vehicles, once flags 5 and 5a are lined up, so are the respective hitch components. Therefore, using the flags as references, the driver directs the towing vehicle toward the trailer hitch 2. Once alignment is accomplished, hitch 2 contacts swing arm offset bracket 7 between its upper and lower sections, 7c and 7d, thereby causing movement of flag 5a and alerting the driver that coupling alignment has been achieved.

The driver then stops the towing vehicle, and detaches the hitch components from hitch 1. The driver does this by first releasing strap 8a and then removing mounting bracket 7. As mentioned, in order to make storage of the hitch components easier, mast 6 may be disassembled and removed from mounting bracket 7. The hitch components are similarly removed from hitch 2.

Figure 6:
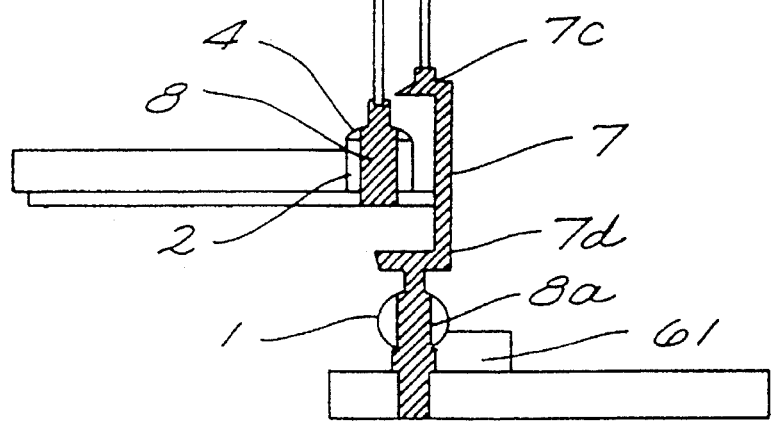
FIG. 6 is an alternative embodiment of the invention showing the use of a light source for nighttime alignment of trailer hitches.

FIG. 6 is an alternative embodiment of the invention showing the use of a light source to illuminate the apparatus for use at night. In this embodiment, light source 60 is mounted to mast 6. Battery 61, mounted to hitch 1, provides power to light source 60 via wires (not shown). While this embodiment shows a single light source, those of ordinary skill in the art readily recognize that a plurality of light sources may be used. Further, light sources may be affixed to mast 3 also.

Similarly, while this embodiment shows the use of battery 61 as the source of power for light source 60, the towing vehicle's electrical system may be used to supply this power. Specifically, a wiring means may be attached to the towing vehicle's electrical system and connect to light source 60, thereby providing the needed power.

As bracket 7 contacts hitch 2, the contact is sensed by a mercury switch or the like causing light 60 to be illuminated.

Figure 6A:
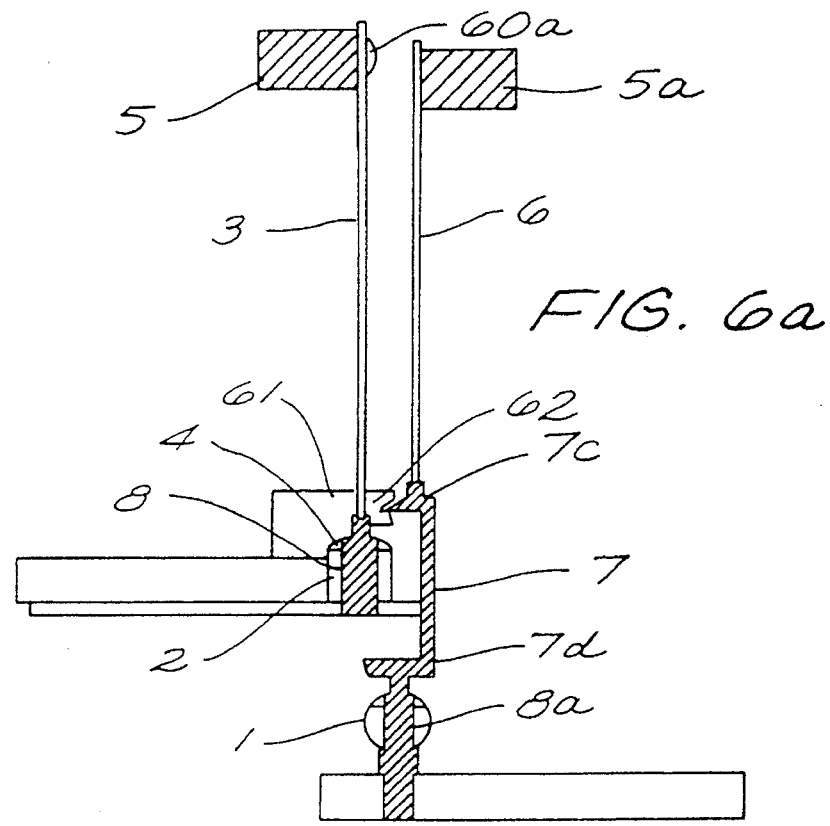
FIG. 6a is an alternative embodiment of the invention showing the use of an audio source for audibly alerting the driver of a towing vehicle when alignment has been achieved.

FIG. 6a is yet another embodiment of the invention showing the use of an audio source 60a to alert the driver of the towing vehicle when hitch alignment has been achieved. In this embodiment, audio source 60a is powered by battery 61. Similarly, sensing means 62 located proximate to hitch 1 is powered by battery 61. When hitch 2 contacts the center portion of mounting bracket 7, sensing means 62 sends a signal to audio source 60a, which in turn emits an audible signal. This signal audibly alerts the driver that alignment has been achieved. While this embodiment depicts battery 61 as the power source of audio source 60a, the towing vehicle's electrical system may be used to supply this power. Those of ordinary skill in the art readily recognize ways to accomplish this.

Figure 6B:
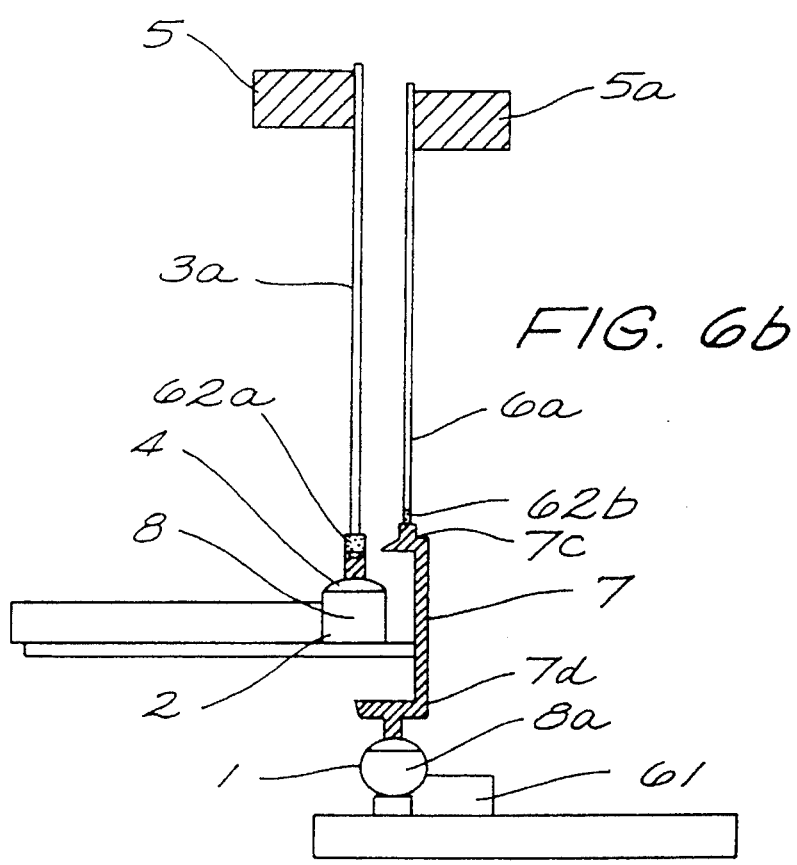
FIG. 6b is an alternative embodiment of the invention showing the mast as being internally illuminated.

FIG. 6b is yet another alternative embodiment of the invention showing 3a and 3b as being internally illuminated. Masts 3a and 3b are each at least partially transparent. Within mast 3a is light source 62a. Similarly, light source 62b is contained within mast 6a. Battery 61, mounted to hitch 1, provides power to light sources 62a and 62b via electrical wires (not shown). While this embodiment shows a single light source in each mast, those of ordinary skill in the art readily recognize that a plurality of light sources may be used. Similarly, while this embodiment shows light sources 62a and 62b located at the base sections of masts 3a and 6a, respectively, those of ordinary skill in the art readily recognize that masts 3a and 6a may be effectively illuminated by placing light sources 62a and 62b at alternative locations within their respective masts.

From the foregoing, it will be understood by those skilled in the art that the disclosed invention is a trailer hitch alignment device capable of providing optimum coupling performance in a variety of weather, terrain, and lighting conditions. Further, while providing this performance, the invention is easy to use and disassemble, providing easy storage.

What is claimed is:

1. A trailer hitch alignment/coupling device comprising:
    a) a first mast assembly for attachment to a trailer hitch of a towed vehicle comprising:
        1) a first mast having a first and second end,
        2) a securing means for securing said first mast to the hitch of a trailer, said securing means comprising:
            A) a base portion being substantially domed in shape and having at least one magnet fixably attached to a concave side of said base portion such that, when secured to said hitch, said at least one magnet contacts said hitch, thereby securing said base portion to said hitch, said first end of said mast removably attached to a convex side of said base portion, and,
            B) a hook and loop strap attached to said base portion, said strap extending from said base portion to said trailer hitch, said hook and loop strap for further securing said base portion to said trailer hitch, and,
        3) at least one rigid flag fixably attached proximate to said second end of said mast;
    b) a second mast assembly for attachment to a trailer hitch of a towing vehicle comprising:
        1) a second mast having a first and second end,
        2) a securing means for securing said second mast to the trailer hitch of a towing vehicle, said securing means comprising:
            A) a base portion comprised of a first and a second part, said first part comprised of a substantially domed member and at least one magnet fixably attached to a concave side of said domed member such that, when secured to said hitch, said at least one magnet contacts said hitch, thereby securing said base portion to said hitch, said second part comprised of a substantially C-shaped member, said first end of said second mast being removably attached to an upper portion of said substantially C-shaped member, said substantially C-shaped member fixably attached to a convex portion of said first part, and,
            B) a hook and loop strap attached to said base portion, said strap extendable from said base portion to said trailer hitch when in use, said hook and loop strap for further securing said base portion to said trailer hitch, and,
        3) at least one rigid flag fixably attached proximate to said second end of said mast;
    c) at least one speaker means for generating an audible signal; and,
    d) at least one sensor means in operative communication with said at least one speaker means and further in operative communication with at least one of said first and second mast assemblies, said at least one sensor means for activating said at least one speaker means when alignment of said first and second mast assembly is achieved.

2. The trailer hitch alignment/coupling device according to claim 1 wherein said first and said second mast are each comprised of at least two interlocking detachable sections.

3. The trailer hitch alignment/coupling device according to claim 1 further including an illumination means for enabling said first and said second mast to be visible during periods of darkness.

4. The trailer hitch alignment/coupling device according to claim 3 wherein said illumination means includes:
    a) at least two lights, at least one of said at least two lights located proximate to each of said flags; and,
    b) a wiring means in operative communication with each of said at least two lights.

5. The trailer hitch alignment/coupling device according to claim 3 wherein said illumination means includes:
    a) at least two lights, at least one of said at least two lights located proximate to each of said flags; and,
    b) a wiring means in operative communication with at least one electrical battery and further in operative communication with each of said at least two lights, said wiring means transporting power from said at least one electrical battery to each of said at least two lights, thereby illuminating each of said at least two lights.

6. The trailer hitch alignment/coupling device according to claim 3 wherein said illumination means includes:
    a) at least one light located within each of said first and second masts, said first and second mast being at least partially transparent; and, b) a wiring means in operative communication with said at least one light.

7. The trailer hitch alignment/coupling device according to claim 3 wherein said illumination means includes:
   a) at least one light located within each of said first and second masts, said first and second mast being at least partially transparent; and,
   b) a wiring means in operative communication with at least one electrical battery and further in operative communication with said at least one light, said wiring means transporting power from said at least one electrical battery to each of said at least one light, thereby illuminating said at least one light.

8. A trailer hitch alignment/coupling device comprising:
   a) a first mast assembly for attachment to a trailer hitch of a towed vehicle comprising:
      1) a first mast having a first and second end,
      2) a securing means for securing said first mast to said hitch of said towed vehicle, said securing means comprising:
         A) a base portion being substantially domed in shape and having at least one magnet fixably attached to a concave side of said base portion such that, when secured to said hitch, said at least one magnet contacts said hitch, thereby securing said base portion to said hitch, said first end of said mast removably attached to a convex side of said base portion, and,
         B) at least one strap attached to said base portion, said strap extending from said base portion to said trailer hitch, said strap for further securing said base portion to said trailer hitch, and,
         C) at least one rigid flag fixably attached proximate to said second end of said first mast; and,
   b) a second mast assembly for attachment to a trailer hitch of a towing vehicle comprising:
      1) a second mast having a first and second end,
      2) a securing means for securing said second mast to the trailer hitch of a towing vehicle, said securing means comprising:
         A) a base portion comprised of a first and a second part, said first part comprised of a substantially domed member and at least one magnet fixably attached to a concave side of said domed member such that, when secured to said hitch, said at least one magnet contact said hitch, thereby securing said base portion to said hitch, said second part comprised of a substantially C-shaped member, said C-shaped member being fixably attached to a convex portion of said first part, and,
         B) a strap attached to said first part of said base portion, said strap extendable from said base portion to said trailer hitch when in use, said strap for further securing said base portion to said trailer hitch, and,
      3) at least one rigid flag fixably attached proximate to said second end of said second mast;
   c) at least one speaker means for generating an audible signal; and,
   d) at least one sensor means in operative communication with said at least one speaker means and further in operative communication with at least one of said first and second mast assemblies, said at least one sensor means for activating said at least one speaker means when alignment of said first and second mast assembly is achieved.

9. The trailer hitch alignment/coupling device according to claim 8 wherein said first end of said second mast is removably attached to an upper portion of said substantially C-shaped member.

10. The trailer hitch alignment/coupling device according to claim 8 wherein an offset member is removably attached to an upper portion of said substantially C-shaped member, said offset member having three parts:
    a) a center part being substantially parallel in orientation to said first mast when said offset member is attached to said upper portion of said substantially C-shaped member;
    b) a lower part connected at one end of said center part, said lower part removably attached to an upper portion of said substantially C-shaped member; and,
    c) an upper part connected at a second end of said center part, said upper part extending from said center part in the opposite direction of said lower part, said second end of said second mast being removably attached to an upper portion of said upper part.

11. The trailer hitch alignment/coupling device according to claim 8 wherein each of said rigid flags is fluorescent so as to allow illumination of said flags by the reverse lights of a towing vehicle during times of darkness.

12. The trailer hitch alignment/coupling device according to claim 8 wherein each of said straps is a hook and loop type.

13. The trailer hitch alignment/coupling device according to claim 8 wherein said first and second masts are each comprised of at least two interlocking detachable sections.

14. The trailer hitch alignment/coupling device according to claim 8 further including an illumination means for illuminating said first and second mast during periods of darkness.

15. The trailer hitch alignment/coupling device according to claim 14 wherein said illumination means includes:
    a) at least two lights, at least one of said at least two lights located proximate to each of said flags; and,
    b) a wiring means in operative communication with each of said at least two lights.

16. The trailer hitch alignment/coupling device according to claim 14 wherein said illumination means is comprised of:
    a) at least two lights, at least one of said at least two lights located proximate to each of said flags; and,
    b) a wiring means in operative communication with at least one electrical battery and further in operative communication with each of said at least two lights, said wiring means transporting power from said at least one electrical battery to each of said at least two lights, thereby illuminating each of said at least two lights.

17. The trailer hitch alignment/coupling device according to claim 14 wherein said illumination means includes:
    a) at least one light located within each of said first and second masts, said first and second mast being at least partially transparent; and,
    b) a wiring means in operative communication with said at least one light.

18. The trailer hitch alignment/coupling device according to claim 14 wherein said illumination means includes:
    a) at least one light located within each of said first and second masts, said first and second mast being at least partially transparent; and,
    b) a wiring means in operative communication with at least one electrical battery and further in operative communication with said at least one light, said wiring means transporting power from said at least one electrical battery to each of said at least one light.

* * * * *